(12) United States Patent
Dauber et al.

(10) Patent No.: US 7,150,778 B1
(45) Date of Patent: Dec. 19, 2006

(54) RECIRCULATION JACKET FILTER SYSTEM

(75) Inventors: Lyle D. Dauber, Street, MD (US);
David R. Peterson, Fallston, MD (US);
Carl A. Betten, Bel Air, MD (US);
Thomas S. Thoner, Havre de Grace, MD (US); D. Michael Reid, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 253 days.

(21) Appl. No.: 10/832,151

(22) Filed: Apr. 26, 2004

(51) Int. Cl.
*B01D 46/46* (2006.01)
*B01D 53/02* (2006.01)

(52) U.S. Cl. ............ 95/8; 95/90; 95/287; 95/900; 96/109; 96/131; 96/135; 55/340; 55/410; 55/417; 55/467; 55/473; 55/485

(58) Field of Classification Search ............ 95/8, 95/90, 287, 900; 96/109, 121, 131, 135; 55/338, 339, 340, 410, 417, 467, 471, 473, 55/485, 466
See application file for complete search history.

(56) References Cited

U.S. PATENT DOCUMENTS

| | | |
|---|---|---|
| 5,443,623 A | 8/1995 | Jonas et al. |
| 6,235,072 B1 | 5/2001 | Kopylov et al. |
| 6,258,151 B1 | 7/2001 | Harle et al. |
| 6,368,393 B1 * | 4/2002 | Hironaka ............ 96/111 |
| 6,494,940 B1 | 12/2002 | Hak |
| 6,527,838 B1 | 3/2003 | Volo et al. |
| 2004/0140194 A1 * | 7/2004 | Taylor et al. ............ 204/164 |

FOREIGN PATENT DOCUMENTS

JP           09155152 A   *   6/1997

* cited by examiner

*Primary Examiner*—Robert A. Hopkins
(74) *Attorney, Agent, or Firm*—Ulysses John Biffoni

(57) ABSTRACT

The present invention is a system and method for improving the useful life of sorbent beds, such as activated carbon filter beds. It is known that breakthrough in carbon filter beds first occurs at the low gas velocity regions of the filter bed, i.e., at the filter's edges. A recirculation jacket filter system diverts already filtered air from the downstream side of the filter bed toward the peripheral region of the upstream side of the filter bed so that contaminants near the filter's edges are reduced and filter life is improved.

17 Claims, 7 Drawing Sheets

RECIRCULATION JACKET FILTER SYSTEM

GOVERNMENT INTEREST

The invention described herein may be manufactured, used and/or licensed by or for the Government of the United States of America.

BACKGROUND OF THE INVENTION

This invention relates generally to fluid separation, and more particularly to fluid separation with recycle means.

Sorbent filters, such as carbon filters typically composed of one or more carbon beds, have been used for many years to remove offensive or harmful organic compounds entrained in air. Although the compounds are retained in all parts of the sorbent beds, studies have shown that a sorbable gas normally demonstrates earliest breakthrough (i.e., complete forward progression through the sorbent) first in the low velocity regions. In a sorbent bed of uniform dimensions and distribution of sorbent, such breakthrough occurs near the bed's edge zones or near a protrusion through the bed.

The finding of an early breakthrough pattern near boundaries, such as edge regions of a sorbent bed, may be explained based on the principles of shearing forces, kinetic energy, and surface area of sorbent pores and research related thereto. A carbon bed, for example, is composed of numerous carbon particles, typically activated carbon particles, confined within a defined volume. The carbon particles forming the bed have numerous tortuous pores of various diameters, generally defined as macropores (>50 nanometers in diameter), mesopores (~2 to 50 nanometers in diameter) and micropores (<2 nanometers in diameter). Macropores and mesopores serve as primary transport channels. If a sorbent bed is considered having substantially planar upstream and downstream surfaces that are also substantially parallel to one another and designed to have a gas flow through the bed in a direction normal to the bed's surfaces, the sorbent bed may be characterized as having a central region or midsection in which most of the efficient sorption takes place and a surrounding peripheral region at the edge of the filter bed, proximate the outer wall of the bed or sorption chamber in which the sorbent is disposed. Studies have shown that most separation of gaseous components takes place in the micropores where shearing forces created by rapidly moving gases are not sufficient to cleave such compounds, in contrast to the mesopores and macropores, the primary transport channels, particularly in the midsection of a filter bed, where such shearing forces are sufficient to cleave sorbable compounds from carbon. Likewise, it is believed that a minimum threshold level of forced flow kinetic energy (KE, expressed mathematically as $KE=\frac{1}{2}mV^2$, where m is mass and V is velocity in consistent units) is required to open the micropore channels, form streamlines through them, and cause sorbable molecules to penetrate the pores deeply before their movement is stopped. Below such a level, sorbable molecules will instead simply continue to travel in forward directed macropores and mesopores. Thus, at low velocities and corresponding weak shearing forces near the edge regions of the sorbent bed, sorption takes place primarily in macropores and mesopores.

The rate of forward progression of the penetration front is determined by the relative rates of filling of the micropores in the midsection and the macropores near the boundary. Sufficient kinetic energy in the midsection enables sorbable compounds to deeply penetrate the micropores. In the midsection of the sorbent bed, the penetration front will advance at a given rate. Simultaneously, near the edge portions of the sorbent bed, where kinetic energy and shearing forces fall off markedly, sorbable compounds bind to macropore wall surfaces at a different rate than to micropore wall surfaces. Due to the much larger (orders of magnitude) surface area of micropores compared to macropores, the penetration front of the gas can advance more rapidly in edge zone macropores than in midsection micropores. Accordingly a penetration front bulge, and concomitant breakthrough, can occur near the edge of the sorbent bed. As a result, the edges or peripheral region demonstrates less capture efficiency (i.e. weight of contaminant captured by the sorbent/weight of sorbent) than in the midsection. Hence, earliest breakthrough generally occurs at the edges, or peripheral regions, of the bed.

SUMMARY OF THE INVENTION

It is therefore an object of this invention to minimize or eliminate contaminant breakthrough at edge or peripheral regions of sorbent beds.

It is another object to trap larger amounts of sorbable contaminant fluids, particularly sorbable gases, than in similar conventional sorbent bed designs and methods used for such purposes.

These and other objects of the invention are achieved in one aspect by a filter system for removing adsorbable compounds from a contaminant-containing fluid. The filter system includes a sorbing chamber having an inlet and an outlet, the inlet, sorbing chamber and outlet defining a primary fluid flow path through the sorbing chamber; an inlet conduit in fluid communication with the inlet of the sorbing chamber; and an effluent conduit in fluid communication with the outlet of the sorbing chamber. Additionally, the filter system includes a sorbent bed disposed within the sorbing chamber transverse to the primary fluid flow path, means for diverting effluent fluid passing from a downstream surface of the sorbent bed at its peripheral region and directing the diverted effluent fluid toward a peripheral region of an upstream surface of the sorbent bed thereby defining a secondary fluid flow path; and a blower disposed downstream of the sorbent bed to draw fluid through the sorbent bed. The edge or peripheral region of the adsorbent bed receives fluid only from the secondary (recirculating) flow path.

Another aspect of the invention involves a method for removing adsorbable compounds from a contaminant-containing fluid, comprising the steps of introducing a contaminant-containing fluid to a sorbing chamber containing a sorbent bed having an upstream surface and a downstream surface; actuating a blower disposed downstream of the sorbent bed; drawing the contaminant-containing fluid through the sorbent bed with the blower such that substantially all of the contaminant is retained by the sorbent bed while effluent fluid, substantially free of contaminant, emerges from the downstream surface of a central region of the sorbent bed; diverting effluent fluid passing through the sorbent bed at its peripheral region; conducting the diverted effluent fluid passing through a peripheral region of the sorbent bed toward the upstream surface of the sorbent bed; and directing the conducted effluent fluid toward a peripheral region of the upstream surface of the sorbent bed.

One of the main advantages of the filter system of the present invention is that for a given volume of sorbent an increased sorption efficiency can be realized. Alternatively, for a given entrapment design criterion, the sorbent bed may be made physically smaller than conventional sorbent beds using the same type of sorption agent. In situations where reduced size sorbent beds may be employed, several cost benefits may be realized. These include reduced acquisition costs, reduced energy costs, reduced hazardous materials costs, and reduced structural support costs.

The filter system may be used in free standing units or incorporated into other devices in which air is forced into or drawn through such other devices. It may be used in any commercial, industrial, or military application where gaseous contaminants are to be removed from another predominant gas, such as air. Examples of situations where the filter system might be used include such diverse applications as scrubbing effluents, filtering air in HVAC and air conditioning systems, filtering air at sites where harmful gases or vapors may be encountered, filtering air at potential terrorist sites, and filtering air in vehicles.

Additional advantages and features will become more apparent as the subject invention becomes better understood by reference to the following detailed description when considered in conjunction with the accompanying drawings.

DETAILED DESCRIPTION

Figure 1:
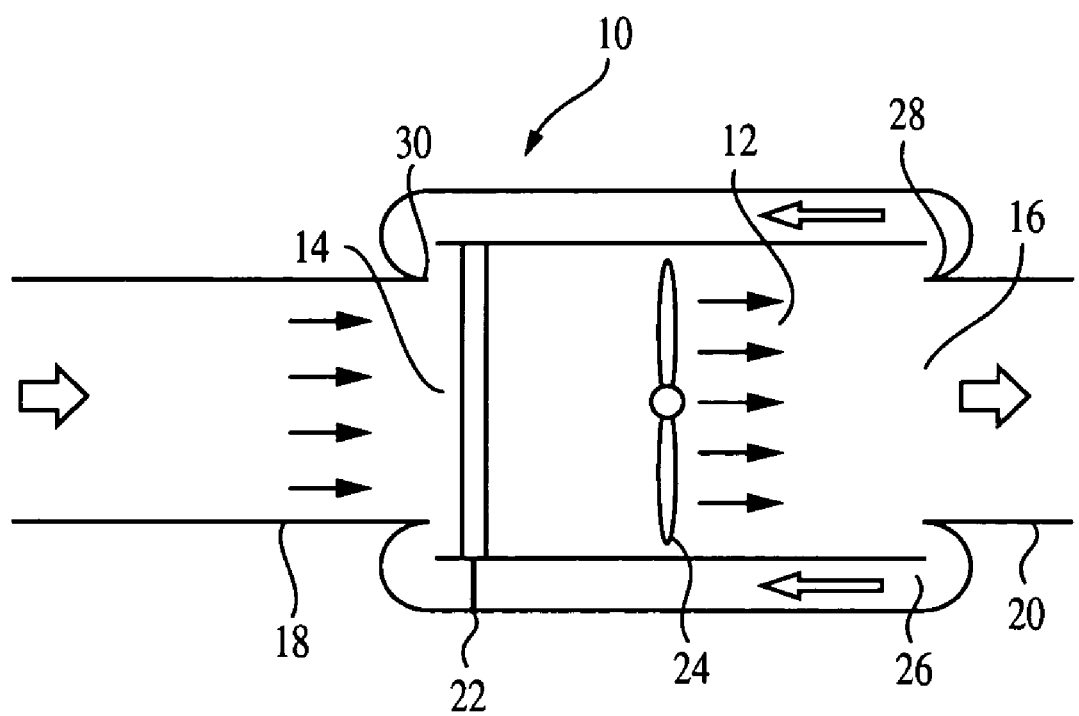
FIG. 1 is a sectional view of a filter system constructed in accordance with the present invention.

Referring to FIG. 1, a filter system 10 is provided with a sorbing chamber 12 having a fluid inlet 14 at the upstream region of the chamber and a fluid outlet 16 at the downstream region of the chamber. A fluid inlet conduit 18 is provided in fluid communication with the fluid inlet 14 and a fluid effluent conduit 20 is provided in fluid communication with the fluid outlet 16. A sorbent bed 22 is provided within the sorbing chamber 12. Typically, the sorbent bed 22 is disposed transverse to the width or diameter of the sorbing chamber 12 and substantially perpendicular to the direction of fluid flow; however, other orientations may be used for a particular purpose or situation.

A motor driven blower 24 is disposed within the sorbing chamber 12, downstream of the sorbent bed 22. The blower 24 is of sufficient dimensions and power, when actuated, and the fan blades, or similar mechanism, are of such a pitch as to draw fluid in through the inlet conduit 18 and expel it through outlet conduit 20. Fluid passing through the filter system 10 defines a primary fluid flow path composed of the fluid inlet 14, sorbing chamber 12, and fluid outlet 16. Small arrows in FIGS. 1 and 2 indicate the direction of primary fluid flow through the filter system 10.

The filter system 10 is further provided with a recirculation jacket 26 for diverting effluent fluid passing from the downstream surface of the sorbent bed 22 at its peripheral region and directing the diverted effluent fluid toward a peripheral region of the upstream surface of the sorbent bed, thereby defining a secondary fluid path. The peripheral region of sorbent bed 22 is exposed substantially exclusively to the secondary fluid path, which only carries previously filtered fluid. Thus, the peripheral region of the bed 22 sees few, if any, contaminants.

In operation, a contaminant-containing fluid, such as air, is fed to the fluid inlet conduit 18. As a result of the negative pressure upstream of the sorbent bed 22 and the positive pressure downstream of the sorbent bed, caused by the blower 24, the contaminant-containing fluid is drawn into the fluid inlet 14 and the sorbing chamber 12 and through the sorbent bed 22. Contaminants present in the contaminant-containing fluid passing through the central region of the sorbent bed 22 and any small amounts of contaminants that may reach the peripheral region of the sorbent bed adjacent to the wall of the sorbing chamber 12, are sorbed, or retained, by the sorbent bed. Under typical operating conditions, the effluent fluid that passes through the sorbent bed 22 is contaminant-free and continues to flow past the blower 24 and out of the sorbing chamber 12 through the fluid outlet 16 and the fluid outlet conduit 20. The portion of the effluent fluid that passes through the peripheral region of the sorbent bed 22 is essentially contaminant free but may have small amounts of contaminant present, particularly when the system is initially activated. The effluent fluid emanating from the peripheral region of the downstream surface of the sorbent bed 22 enters the recirculation jacket 26 at its inlet 28 and is drawn through the recirculation jacket by the negative pressure created at its outlet 30, located upstream of the sorbent bed. As the previously filtered effluent fluid flows from the recirculation conduit outlet 30 it is directed to the peripheral region of the upstream surface of the sorbent bed. Thus, the peripheral region of the sorbent bed sees, at most, only a minuscule amount of contaminants. In comparison to traditional filter bed arrangements in which the peripheral region is the first region to experience breakthrough, the peripheral region of the filtration system of the invention is the last region to show breakthrough.

While the filter system 10 may be used to separate one or more sorbable fluids from other fluids, either liquids or gases, its greatest use may be to separate gaseous or volatile components from one another. Most typically, the filter system 10 is expected be used to separate one or more contaminant gases from another gas that is a major component of a gaseous mixture. Most applications are expected to be directed to removal of offensive gases, such as noxious or toxic gases, from air. Accordingly, the particular sorbent employed depends on the nature of the fluids being separated. When those fluids are gases, most typically, the sorbent is carbon; however, other sorbents that employ the same or similar sorbing mechanisms as carbon, or a molecular sieve, may be used. When the fluid being treated is air, carbon is generally the preferred sorbent, with some form of finely divided or activated carbon being most preferred. In some instances, to efficiently remove specific contaminants, the sorbent may be treated with a particular reagent reactive with the contaminant. The filter system 10 illustrated in FIGS. 1 and 2 is exemplary of a system to purify gases such as air.

MODIFICATIONS

Reference is now made to the systems shown in FIGS. 2–7, which are similar to the system described above.

Figure 2:
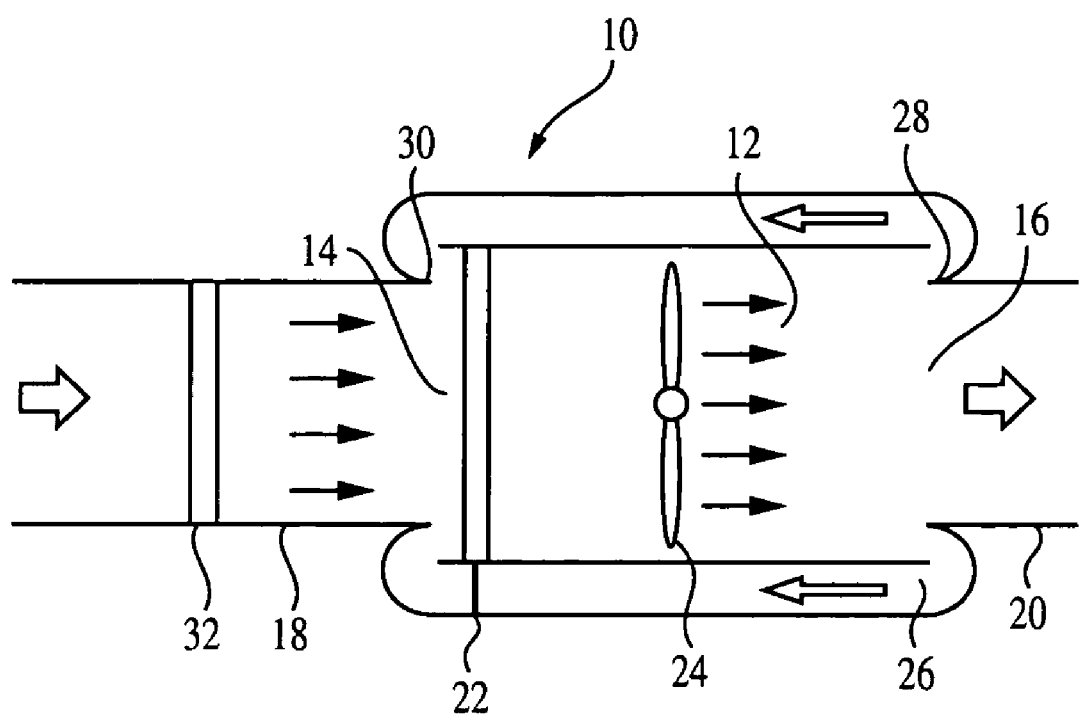
FIGS. 2–7 show modifications of the system of FIG. 1.

The difference in the system of FIG. 2 is the addition of a high efficiency particulate air (HEPA) filter 32, for retaining fine particulate matter, disposed upstream of the sorbent bed 22, within and transverse to the inlet duct 18.

Figure 3:
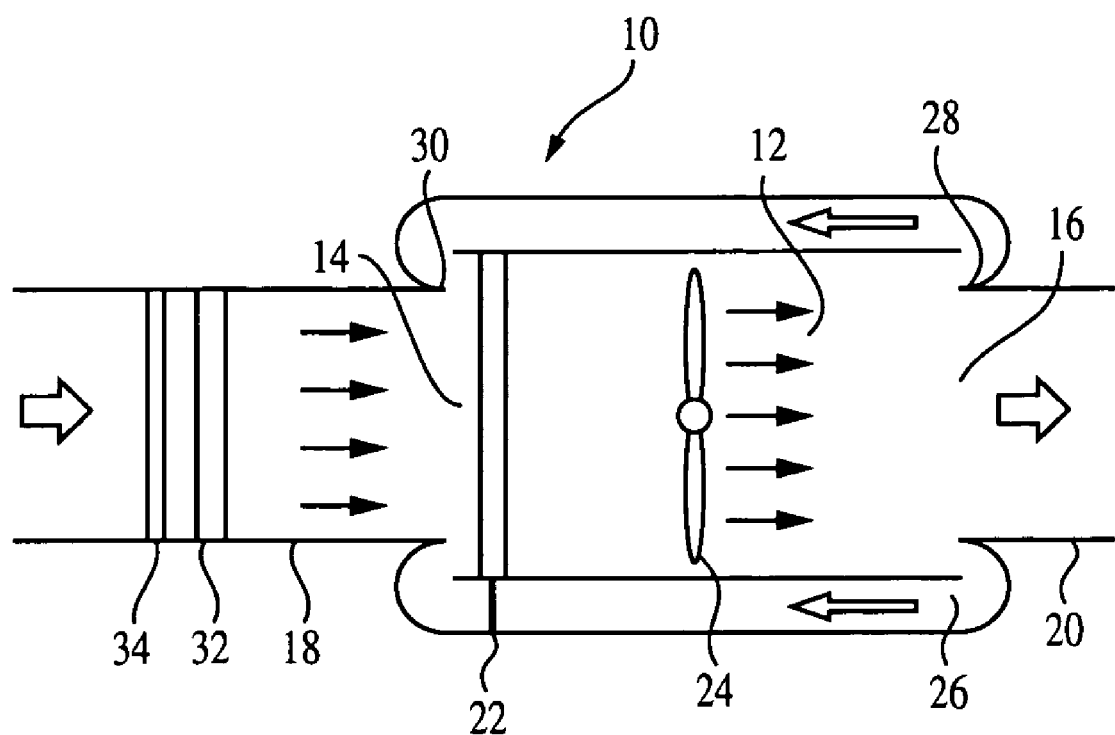

The difference in the system of FIG. 3 is the addition of a HEPA filter 32 and a pre-filter 34 placed upstream of the HEPA filter 32, also within and transverse to the inlet duct 18 in case the presence of larger particulate matter is suspected in the contaminated fluid.

Figure 4:
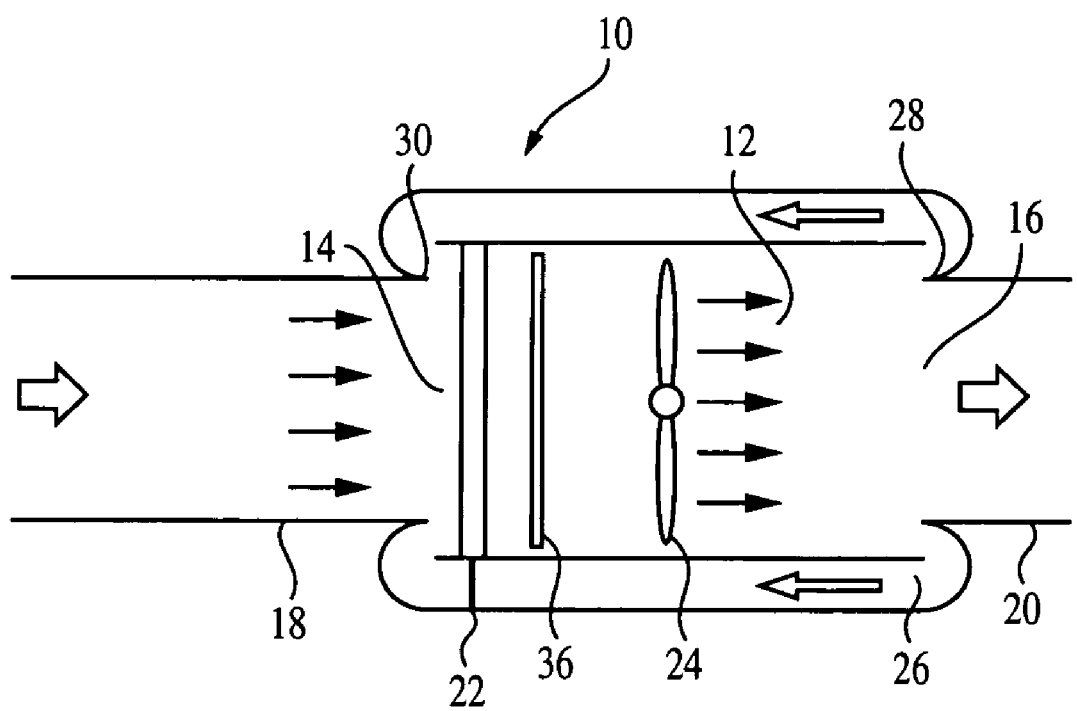

The difference in the system of FIG. 4 is the addition of a diffuser 36 disposed within the sorbing chamber 12 intermediate the sorbent bed 22 and the blower 24 and transverse to the primary fluid flow path. The diffuser is used to thoroughly mix and distribute the effluent fluid after passing through the sorbent bed 22.

Figure 5:
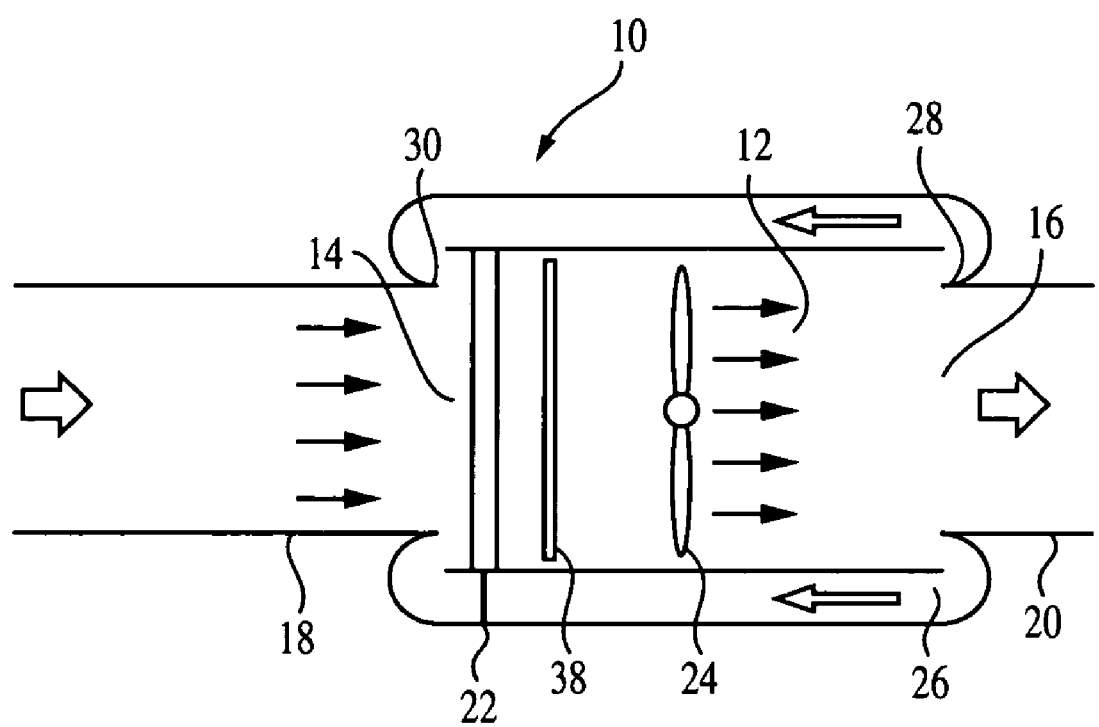

The difference in the system of FIG. 5 is the addition of a monitoring system 38 located within and transverse to the sorbing chamber 12 to determine whether breakthrough has occurred. The exact nature of the monitoring system may vary depending on the exact nature of the contaminant(s) present in the fluid being treated by the filtration system. Typically, a pipe tap could be located in the wall of the apparatus housing or sorbing chamber, fitted with an appropriate plug. When the system is monitored, the plug can be removed and a small amount of effluent fluid bled off and analyzed by appropriate electroanalytic means, such as a gas chromatograph.

Figure 6:
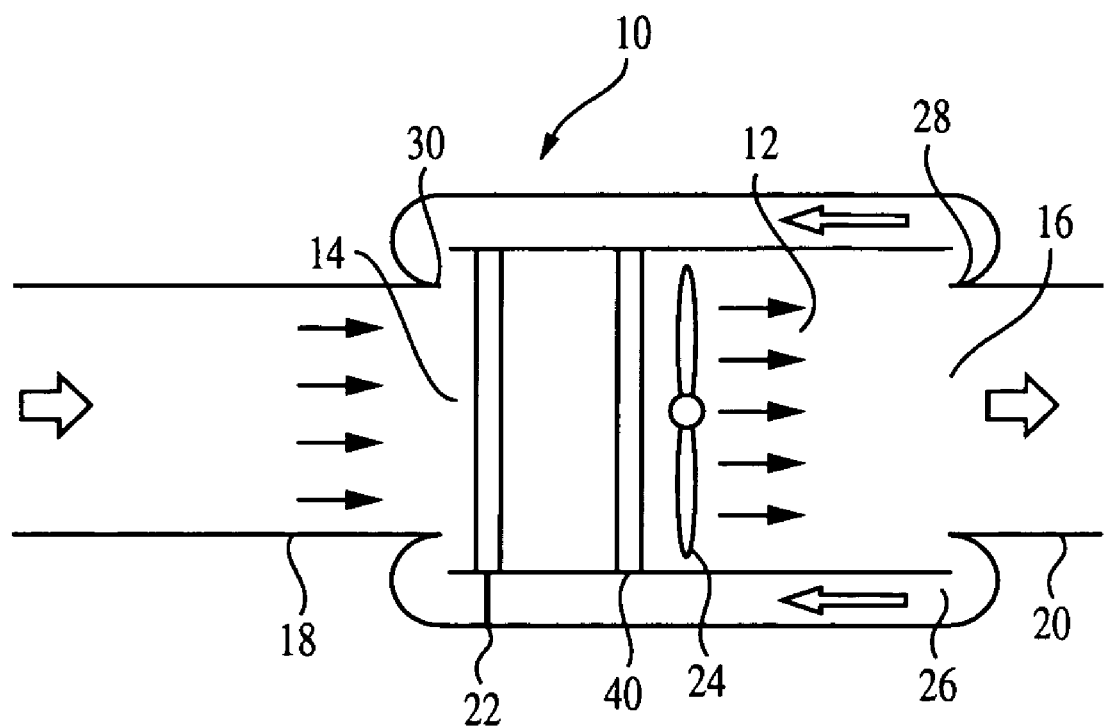

The difference in the system of FIG. 6 is the addition of a second sorbent bed 40 disposed within the sorbing chamber 12 downstream from the primary sorbent bed 22. Typically, the orientation of the second sorbent bed 40 is the same as that of the primary sorbent bed 22, transverse to the direction of fluid flow; however, in particular situations it may be desirable to employ other orientations, such as V-bed configurations. Although the primary sorbent bed 22, in combination with the recirculation jacket 29, is quite efficient in preventing breakthrough of contaminant during operation of the filtering system of the invention, the secondary sorbent bed 40 may be used to remove small traces of contaminants that might be found in effluent during the first few seconds of operation of the system or that might occur should the contaminants be present in extremely high concentrations upstream of the primary sorbent bed 22. Either the primary sorbent bed 22, when used alone, or when used in combination with the second sorbent bed 40, may be impregnated with a reagent (e.g. triethylenediamine) known to react with a specific contaminant or class of contaminants, for example, blood agents.

Figure 7:
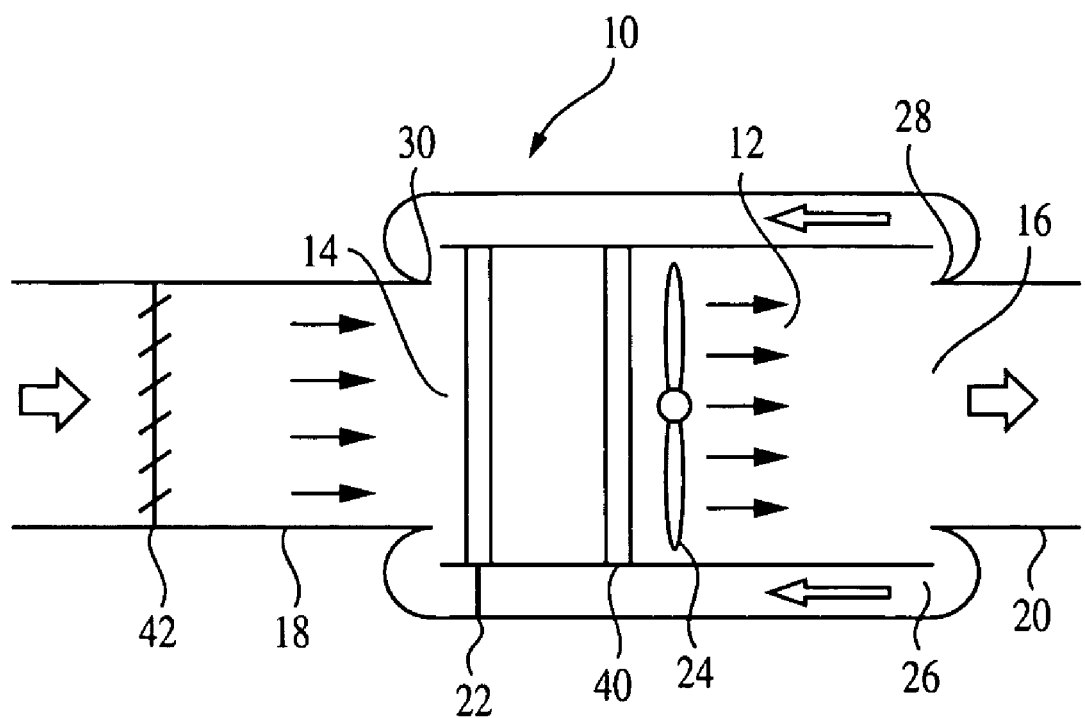

The difference in the system of FIG. 7 is the addition of a fluid shutoff mechanism 42 disposed transverse to the direction of fluid flow in the inlet conduit 18, upstream of the sorbent bed 22. This mechanism, taking the form of a valve or series of gates or locks, is provided to terminate all flow of contaminant-containing fluids in the event of a power disruption or blower malfunction so as to prevent any flow of unfiltered fluids through the recirculation jacket.

Obviously, numerous other modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A filter system for removing at least one contaminant from a contaminant-containing fluid, comprising:
   a sorbing chamber having an inlet and an outlet, the inlet, sorbing chamber, and outlet defining a primary fluid flow path through the sorbing chamber;
   an inlet conduit in fluid communication with the inlet of the sorbing chamber;
   an effluent conduit in fluid communication with the outlet of the sorbing chamber;
   a first sorbent bed disposed within the sorbing chamber transverse to the primary fluid flow path, the first sorbent bed having an upstream surface and a downstream surface;
   means for diverting effluent fluid passing from the downstream surface of the first sorbent bed at its peripheral region and directing the diverted effluent fluid toward a peripheral region of the upstream surface of the first sorbent bed, thereby defining a secondary fluid flow path, wherein said means for diverting comprises a recirculation jacket having a fluid inlet lip extending into the peripheral region of the primary fluid flow path downstream of said sorbent bed to capture already-filtered fluids only, and said recirculation jacket including a conduit connecting said fluid inlet lip to a fluid outlet lip located upstream of said sorbent bed to direct said captured already-filtered fluids to the inlet of said sorbent bed at its peripheral region only, and wherein said sorbent bed extends into and is attached to said recirculation jacket so that the edge region of said sorbent bed is only exposed to the secondary fluid flow path; and
   a blower disposed downstream of the sorbent bed to draw fluid through the first sorbent bed.

2. The filter system recited in claim 1, further comprising a diffuser disposed within said sorbing chamber intermediate said first sorbent bed and said blower.

3. The filter system recited in claim 1, further comprising an effluent gas monitoring system disposed within said sorbing chamber downstream of said first sorbent bed.

4. The filter system recited in claim 1, wherein the sorbent in the first sorbent bed is activated carbon.

5. The filter system recited in claim 1, further comprising a second sorbent bed disposed downstream of said first sorbent bed.

6. The filter system recited in claim 1, further comprising a HEPA filter disposed in said inlet conduit.

7. The filter system recited in claim 1, further comprising a prefilter disposed in said inlet conduit.

8. The filter system recited in claim 5, further comprising a diffuser located within said sorbing chamber intermediate said first sorbent bed and said second sorbent bed.

9. The filter system recited in claim 5, further comprising a monitoring system disposed within said sorbing chamber intermediate said first sorbent bed and said second sorbent bed.

10. The filter system recited in claim 6, further comprising a prefilter disposed in said inlet conduit upstream of said HEPA filter.

11. The filter system recited in claim 1, further comprising a fluid shutoff mechanism disposed in said inlet conduit upstream of said first sorbent bed.

12. A method for removing at least one contaminant from a contaminant-containing fluid, comprising:
   (a) introducing a contaminant-containing fluid to a sorbing chamber containing a first sorbent bed having an upstream surface and a downstream surface;
   (b) actuating a blower disposed downstream of the sorbent bed;
   (c) drawing the contaminant-containing fluid through the sorbent bed disposed in the sorbing chamber with the blower such that substantially all of the contaminant is retained by the sorbent bed while effluent fluid, substantially free of contaminant, emerges from the downstream surface of the sorbent bed;
   (d) diverting effluent fluid passing through the sorbent bed at the full perimeter of its peripheral region;
   (e) conducting said diverted effluent fluid passing through the full perimeter of said peripheral region of the sorbent bed toward the upstream surface of the sorbent bed; and
   (f) directing said conducted effluent fluid toward the full perimeter of the peripheral region of the upstream surface of the sorbent bed.

13. The method recited in claim 12, further including the step of passing the contaminant-containing fluid through a HEPA filter prior to entering the sorbing chamber.

14. The method recited in claim 13, further including the step of passing the contaminant-containing fluid through a prefilter prior to passing through the HEPA filter.

15. The method recited in claim 12, further including the step of passing the effluent fluid through a second sorbent bed before the effluent fluid drawn through the first sorbent bed at its peripheral region is diverted.

16. The method recited in claim 15, further including the step of passing the effluent fluid from the first sorbent bed through a diffuser before passing it through the second sorbent bed.

17. The method recited in claim 12, further including the step of monitoring the composition of the effluent fluid after passing through the first sorbent bed.

* * * * *